(12) United States Patent
Lindoff et al.

(10) Patent No.: US 8,625,516 B2
(45) Date of Patent: Jan. 7, 2014

(54) CONTROL CHANNEL DECODING OF NEIGHBORING CELLS

(75) Inventors: Bengt Lindoff, Bjärred (SE); Matthias Kamuf, Lund (SE); Reial Andres, Malmö (SE)

(73) Assignee: Telefonaktiebolaget L M Ericsson (publ.), Stockholm (SE)

( * ) Notice: Subject to any disclaimer, the term of this patent is extended or adjusted under 35 U.S.C. 154(b) by 247 days.

(21) Appl. No.: 13/172,908

(22) Filed: Jun. 30, 2011

(65) Prior Publication Data

US 2013/0003569 A1    Jan. 3, 2013

(51) Int. Cl.
*H04W 4/00* (2009.01)
*H04W 28/04* (2009.01)

(52) U.S. Cl.
CPC .................................. *H04W 28/04* (2013.01)
USPC ......................................................... 370/329

(58) Field of Classification Search
CPC ...................................................... H04W 28/04
USPC ......................................................... 370/329
See application file for complete search history.

(56) References Cited

U.S. PATENT DOCUMENTS

| | | | | |
|---|---|---|---|---|
| 8,406,210 | B2 * | 3/2013 | Kim | 370/345 |
| 2010/0009634 | A1 | 1/2010 | Budianu et al. | |
| 2010/0042887 | A1 * | 2/2010 | Yamada et al. | 714/749 |
| 2010/0190447 | A1 | 7/2010 | Agrawal et al. | |
| 2010/0208667 | A1 * | 8/2010 | Chun et al. | 370/329 |
| 2010/0227569 | A1 * | 9/2010 | Bala et al. | 455/73 |
| 2010/0278037 | A1 | 11/2010 | Jen et al. | |
| 2010/0278131 | A1 * | 11/2010 | Jeong et al. | 370/329 |
| 2010/0304748 | A1 | 12/2010 | Henttonen et al. | |
| 2010/0317360 | A1 | 12/2010 | McBeath et al. | |
| 2012/0039295 | A1 * | 2/2012 | Quan et al. | 370/329 |
| 2012/0281654 | A1 * | 11/2012 | Aiba et al. | 370/329 |

FOREIGN PATENT DOCUMENTS

| | | | |
|---|---|---|---|
| WO | 2008038983 | A1 | 4/2008 |
| WO | 2008092962 | A1 | 8/2008 |
| WO | 2010108136 | A1 | 9/2010 |
| WO | 2010129814 | A2 | 11/2010 |

OTHER PUBLICATIONS

NTT DoCoMo, Inc., "Summary (with revision marks) of email discussion point 3: Initial Access Procedure: C-RNTI and HARQ," 3GPP TSG RAN WG2 #56bis, Tdoc-R2-070338, Jan. 15-17, 2007, 9 pages.*
IP Wireless, et al., "RACH access optimisation," 3GPP TSG RAN WG2 #59, R2-073186, Jun. 2007, 6 pages.*
International Search Report, PCT/EP2012/060984, Jul. 27, 2012.
Written Opinion, PCT/EP2012/060984, Jul. 27, 2012.

* cited by examiner

*Primary Examiner* — Steven H Nguyen
*Assistant Examiner* — Phuongchau B Nguyen
(74) *Attorney, Agent, or Firm* — Potomac Patent Group PLLC

(57) ABSTRACT

A method of determining a radio network temporary identifier (RNTI) includes descrambling a control channel, decoding control messages included in the control channel wherein the decoded control messages include control bits and received cyclic redundancy check (CRC) bits, generating a CRC from the decoded control bits, determining the RNTI from the generated CRC and received CRC and utilizing the RNTI for decoding subsequent subframes.

18 Claims, 4 Drawing Sheets

CONTROL CHANNEL DECODING OF NEIGHBORING CELLS

TECHNICAL FIELD

The invention relates generally to a mobile terminal, and more particularly, to methods and apparatus for improving the terminal performance.

BACKGROUND

Forthcoming releases of the 3GPP LTE ($3^{rd}$ Generation Partnership Project Long Term Evolution) and HSPA (High Speed Packet Access) standard facilitate dual-carrier operation. In dual carrier operation, the user equipment (UE) can transmit and receive on multiple system carriers simultaneously. A dual carrier system 100 is illustrated in FIG. 1. A dual carrier capable UE 112 can transmit to, and receive from, serving cell 110 on multiple system carriers (f1 and f2) simultaneously. A dual carrier system can increase the maximal throughput. Throughput is roughly proportional to N where N is the number of carriers. Therefore, the throughput in a dual carrier system can increase by a factor of two (from 100 Mb/s to 200 Mb/s for example). A dual-carrier (or dual-cell) mobile terminal (or UE) for use in the dual carrier system needs the ability to process two downlinks (and/or two uplinks) at the same time. Typically, this means that baseband processing capability of a dual-carrier mobile terminal (such as channel estimation/decoding, etc.) is double that of a single-carrier mobile terminal.

The co-ordination of transmission from antennas positioned in different sites have also evolved in these standards such as advanced Inter-Cell Interference Co-ordination (ICIC), Co-ordinated MultiPoint (CoMP) transmission and the introduction of Remote Radio Units (RRU). These techniques enable fast co-ordinated transmissions from several antenna positions including beam forming and nulling. With nulling, interference can be strongly reduced to a specific UE. In coherent CoMP transmissions, the nulling gain is included in the algorithm of selecting co-scheduled mobiles and antenna pre-coding weights.

In order to increase capacity, MU-MIMO (Multi User Multiple Input Multiple Output) is used. In MU-MIMO, the radio resources are reused by transmitting on the same time and frequency to multiple UEs.

Dual-carrier (dual-cell) LTE/HSPA will probably be applied only in hot spot regions and also is only needed for very high throughput scenarios such as when single carrier transmission is insufficient. Therefore, in many use cases, where a single carrier is used, the baseband processing is not fully utilized in the mobile terminal. According to a common scenario in cellular systems, as illustrated in FIG. 2, a terminal 212 is at the cell border between two cells. One of these cells is the serving cell (SC) 210 and the other cell is a neighboring cell (NC) (or multiple neighboring cells) 220. A signal S that is being communicated between serving cell 210 and UE 212 is being subjected to interference I from neighboring cell 220. In such a scenario, the signal-interference-ratio (SI or SIR or carrier-to-interference ratio, C/I) is approximately 0 dB (SI≈0). As a result, full downlink (DL) throughput cannot be achieved. However, in these scenarios, the extra processing power can be used for detecting and cancelling the interfering signals, I.

A terminal connected to a cell receives control information on the physical downlink control channel (PDCCH). This information can be utilized by the terminal to determine whether it (i.e. the terminal) is scheduled to receive data packets on the PDSCH (physical downlink shared channel) in the downlink of its serving cell in the current subframe.

However, a significant problem is the decoding of the control channels (i.e. PDCCH) of the neighboring cells since the terminal (that is trying to decode PDCCHs) is unaware of the terminals that are connected to the neighboring cells. This makes the cancelling process of neighboring cells' physical channels (such as, for example, PDSCH) significantly more complex.

There exists a need therefore for a method and apparatus for improving the blind decoding of control channels from neighboring cells in order to make practical interference cancelling receivers capable of cancelling interference from neighboring cells.

SUMMARY

It should be emphasized that the terms "comprises" and "comprising", when used in this specification, are taken to specify the presence of stated features, integers, steps or components; but the use of these terms does not preclude the presence or addition of one or more other features, integers, steps, components or groups thereof.

In exemplary embodiments, the foregoing and other objects are achieved in methods, systems, and apparatuses for utilizing information received by a user equipment.

According to an embodiment, a method of determining a radio network temporary identifier (RNTI) is disclosed. The method includes determining a radio network temporary identifier (RNTI) includes descrambling a control channel, decoding control messages included in the control channel wherein the decoded control messages include control bits and received cyclic redundancy check (CRC) bits, generating a CRC from the decoded control bits, determining the RNTI from the generated CRC and received CRC and utilizing the RNTI for decoding subsequent subframes.

According to another embodiment, a user equipment for determining an RNTI is disclosed. The user equipment includes a receiver for down converting a received radio signal to a baseband signal, an analog to digital converter for transforming the baseband signal to a digital signal, a cell search and measuring unit for detecting neighboring cells and for measuring signals on a serving cell and on the detected cells, a decoder for decoding the digital signal wherein the decoded signal includes control bits and received cyclic redundancy check (CRC) bits and a control unit. The control unit generates a CRC from the decoded control bits and determines a radio network temporary identifier candidate (RNTI) from the generated CRC and received CRC.

According to a further embodiment, a computer program including computer readable program modules is disclosed. The computer program, when run on a user terminal causes the user terminal to: descramble a control channel, decode control messages included in the control channel wherein the decoded control messages include control bits and received cyclic redundancy check (CRC) bits, generate a CRC from the decoded control bits, determine the RNTI from the generated CRC and received CRC and utilize the RNTI for decoding subsequent subframes.

BRIEF DESCRIPTION OF THE DRAWINGS

The objects and advantages of the invention will be understood by reading the following detailed description in conjunction with the drawings in which.

DETAILED DESCRIPTION

Figure 1:
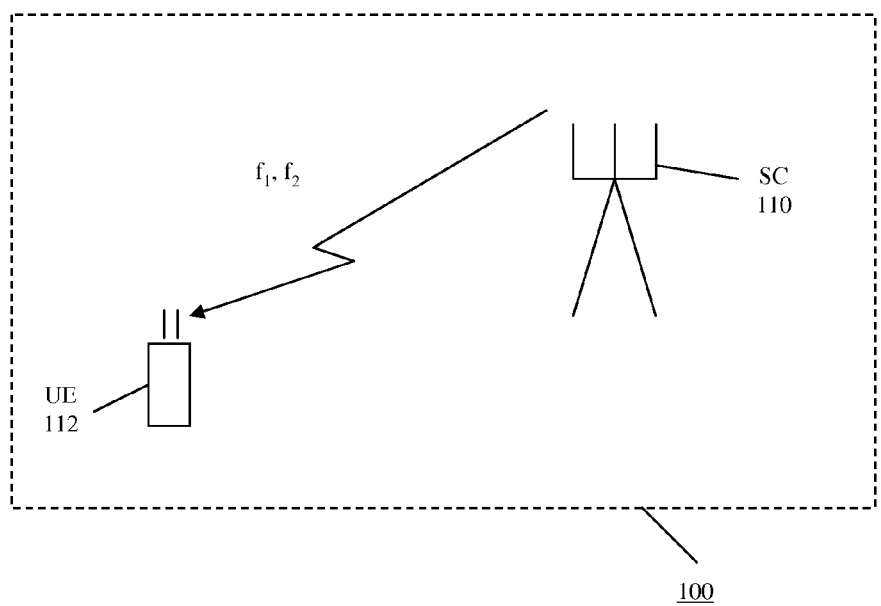
FIG. 1 illustrates a dual carrier system with dual carrier terminal.
Figure 2:
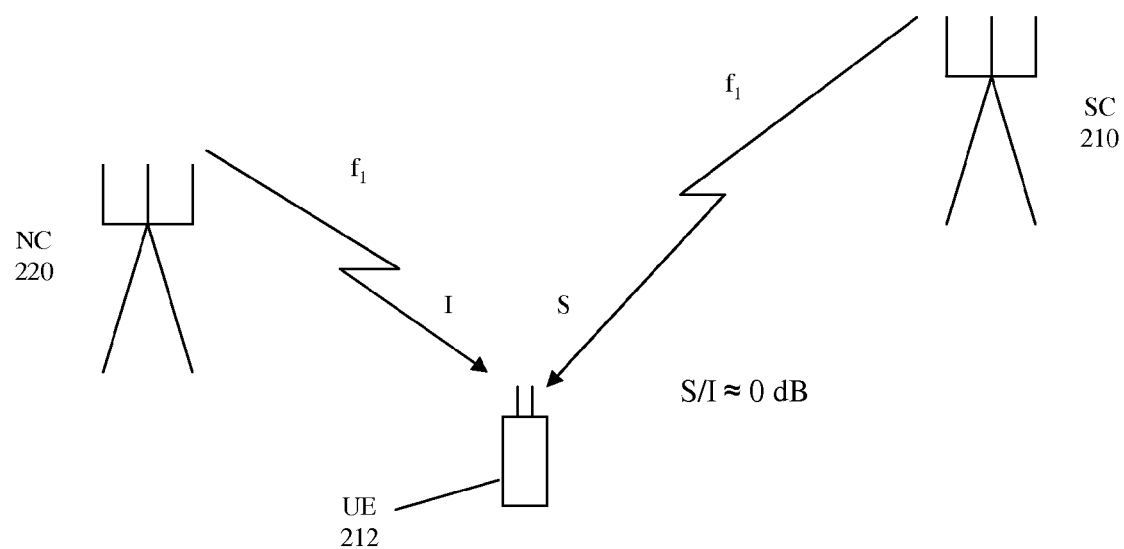
FIG. 2 illustrates a single carrier system with dual carrier terminal.

The various features of the invention will now be described with reference to the figures, in which like parts are identified with the same reference characters.

The various aspects of the invention will now be described in greater detail in connection with a number of exemplary embodiments. To facilitate an understanding of the invention, many aspects of the invention are described in terms of sequences of actions to be performed by elements of a computer system or other hardware capable of executing programmed instructions. It will be recognized that in each of the embodiments, the various actions could be performed by specialized circuits (e.g., analog and/or discrete logic gates interconnected to perform a specialized function), by one or more processors programmed with a suitable set of instructions, or by a combination of both. The term "circuitry configured to" perform one or more described actions is used herein to refer to any such embodiment (i.e., one or more specialized circuits and/or one or more programmed processors).

Moreover, the invention can additionally be considered to be embodied entirely within any form of computer readable carrier, such as solid-state memory, magnetic disk, or optical disk containing an appropriate set of computer instructions that would cause a processor to carry out the techniques described herein. Thus, the various aspects of the invention may be embodied in many different forms, and all such forms are contemplated to be within the scope of the invention. For each of the various aspects of the invention, any such form of embodiments as described above may be referred to herein as "logic configured to" perform a described action, or alternatively as "logic that" performs a described action.

In exemplary embodiments, a method for determining radio network temporary identifiers (RNTIs) used in neighboring cells is described. Once a first terminal determines a reliable RNTI (i.e. a second terminal identity) in a neighboring cell, the first terminal can decode the control channel (the PDCCH in LTE for example) and data packet(s) transmitted on a physical data channel (PDSCH in LTE) for that particular second terminal and utilize that information in the processing of the packets to the first terminal. Improved receiver performance, especially at the cell border, may be achieved.

As the first terminal detects a neighboring cell in a cell search step, the cell ID and cell specific scrambling applied to the cell's control channels can also be determined. The control channel may be de-scrambled, and an RNTI candidate may be determined by comparing received cyclic redundancy check (CRC) bits associated to a first decoded control channel message with the CRC generated based on the decoded first control message. All RNTI candidates may be stored in a RNTI candidate list. A RNTI that is used may be the RNTI that has been determined (or occurs) a pre-specified number of times during a pre-specified time period.

According to 3GPP TS 36.212, chapter 5.3.3.2, a PDCCH is scrambled with an RNTI defined by higher layers. The scrambling is performed as a modulo-2 operation on the CRC part, which is needed to reliably declare a decoding attempt as being (or not being) successful. This part constitutes the rightmost 16 bits of the bits $b_k$ for k=0, ..., A+15 to be encoded, $c_k = (b_k + x_{mti,k-A})$ mod 2 for k=A, A+1, A+2, ..., A+15 where $x_{mti}$ denotes the bit representation of the RNTI. A UE looks in pre-defined search spaces for possible PDCCH assignments, see 3GPP TS 36.213, chapter 9.1.1. This search is performed, depending on the downlink control information (DCI) format, using different types of RNTIs, e.g. C-RNTI, RA-RNTI, P-RNTI, SI-RNTI (see 3GPP TS 36.321, chapter 7.1). In general, a DCI format is linked to information about whether the PDCCH is related to UL transmission, one- or two-codeword DL reception (including resource allocation, precoders, MCS, ... ), or a power control message, etc.

While the description of exemplary embodiments is based on RNTI detection in control messages transmitted from neighboring cells, the invention is not limited to that case. For instance, the same technique can be used for determination of RNTI for other terminals connected to the serving cell.

Figure 3:
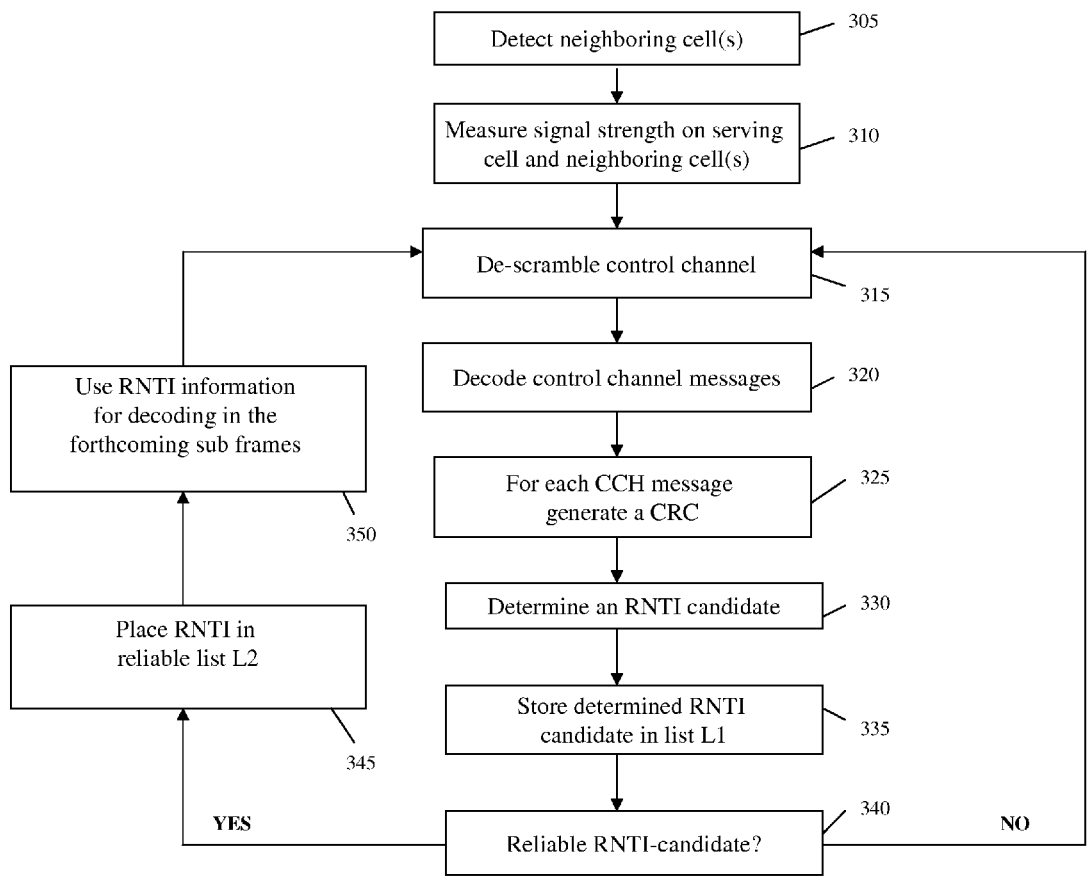
FIG. 3 illustrates a method in accordance with exemplary embodiments.

A method in accordance with an embodiment is illustrated in FIG. 3. A measurement and cell search unit (CS) may determine the presence of (one or more) neighboring cells at 305. Signal strength measurements on the serving cell and on the detected neighboring cell(s) may be made on a regular basis at 310. This may occur typically every 10 to 60 milliseconds (ms) for example. A detector may descramble every sub frame of the PDCCHs originating from the neighboring cell at 315. The PDCCHs (control channel messages) may be decoded at 320. The decoded message includes control bits and scrambled CRC bits. These bits are scrambled by the radio network temporary identifier (RNTI). The scrambled CRC bits may be referred to as received CRC bits and designated as $CRC_R$. It is assumed that the PDCCH payload is in a certain, known downlink control information (DCI) format.

The UE now has an estimate of the combination of a hypothetical (hypothetical in the sense that it is based on the assumption that the unmasked CRC anticipating a specific RNTI might check) PDCCH payload and its corresponding CRC ($CRC_R$). For each decoded CCH message (i.e. payload), the control bits may be used to generate a CRC at 325 (i.e., generation of a check bit sequence from an information bit sequence). The generated CRC may be designated as $CRC_G$. $CRC_G$ may be compared to $CRC_R$ to determine or estimate a RNTI candidate at 330. A suitable distance measure such as, for example, a soft correlation metric may be applied based on the real values of $CRC_R$ and $CRC_G$. An XOR function may alternatively be applied to $CRC_G$ and $CRC_R$. The RNTI candidate may be stored in a first RNTI list (designated as L1) at 335.

Each RNTI in the list may have a timestamp associated with it to indicate the time at which the RNTI was determined for example. RNTI candidates may be removed from the list if the time lapse from when they were determined/generated exceeds a first pre-specified time period T1 (i.e. if a particular RNTI candidate has not been generated during T1).

A counter may also be associated with each RNTI in the list. The counter may be incremented by one (1) each subsequent time a particular RNTI is determined. If a particular RNTI is removed from L1 due to non-occurrence within T1, then the counter associated with the particular RNTI may be reset (and may be associated with another RNTI for example).

Reliability of each RNTI may be evaluated at 340. The evaluation may be based on whether (the counter associated with) a RNTI is more than or equal to a pre-specified number of times F (within T1). If a RNTI has occurred less than F number of times (i.e. RNTI is deemed unreliable), descrambling of additional control channels may continue at 315. If the RNTI has occurred more than or equal to F number of times (i.e. RNTI is deemed reliable), it may be placed in a second RNTI list that may be referred to as reliable RNTI list and designated as L2 at 345. Upon placement of a RNTI in list L2, it (i.e. the RNTI) may be removed from L1. RNTI candidates from this list (i.e. L2) may be utilized in decoding of subsequent sub frames at 350.

The subsequent sub frames may be from the neighboring cell(s) or from the serving cell. Each RNTI in L2 may also have a timestamp associated therewith. If a particular RNTI is already in L2, its timestamp may be updated (in L2). If the time lapse from the timestamp exceeds a second pre-specified time period T2, the RNTI may be removed from L2. In this manner, RNTIs that are not likely to occur or be used any more (even if they were used at an earlier point in time) can be removed.

Since the RNTI candidate is determined assuming that the message is correctly decoded, the CRC could be used for determination of RNTI (as the CRC is scrambled with a scrambling code associated with the RNTI). In case the message was erroneously decoded, the determined RNTI candidate can be a "ghost RNTI". However, by collecting statistics over a time period (designated as T2 that is different from T1), true (i.e. used) RNTIs are likely to occur much more frequently than non-applicable, "erroneous" RNTIs which may be randomly distributed over all possible RNTIs. The reason for determining true used RNTIs by checking the number of occurrences is that the total number of RNTIs is in the order of $2^{16}$ (65536 or $\approx$64K) while the number of active terminals at a certain time interval is much smaller (i.e. between 10-100). Therefore, an erroneous RNTI will be evenly distributed among the 64K RNTIs while true RNTIs will be distributed among the 10-100 RNTIs.

Depending on the used RNTIs that are declared to be reliable, different conclusions can be drawn about interference towards the UE's reception in its serving cell. For example, decoding a neighboring cell's PDCCH scrambled with SI-RNTI tells the UE where the system information is located in subframe #5. This value is static (see 3GPP TS 36.321, chapter 7.1) and can hence always be detected in subframe #5. The information may then be used for decoding the PDSCH, for interference cancelling, etc.

Another example could involve the decoding of another UE in the serving cell that is co-scheduled in a multi-user fashion (i.e. sharing the same time and frequency resources). Based on information about MCS, precoding can then be utilized for advanced inter-layer interference suppression. The first UE, once a reliable RNTI has been determined for a second terminal (or UE) in a neighboring cell, can decode PDCCH and check whether the control messages match with the currently determined RNTIs.

Then, the first UE can determine which MCS (Modulation and Coding Scheme) and resource block allocation is used to allocate data on PDSCH for the second terminal in the neighboring cell. Other parameters (such as precoders for example) can be found in the definition of the respective DCI message. These parameters may assist or help in the cancellation process. By comparing the resource block allocation for data to the first UE, the first UE can identify whether its own data is interfered and thereby selectively start IC (interference cancellation) process for suppressing the interference.

Figure 4:
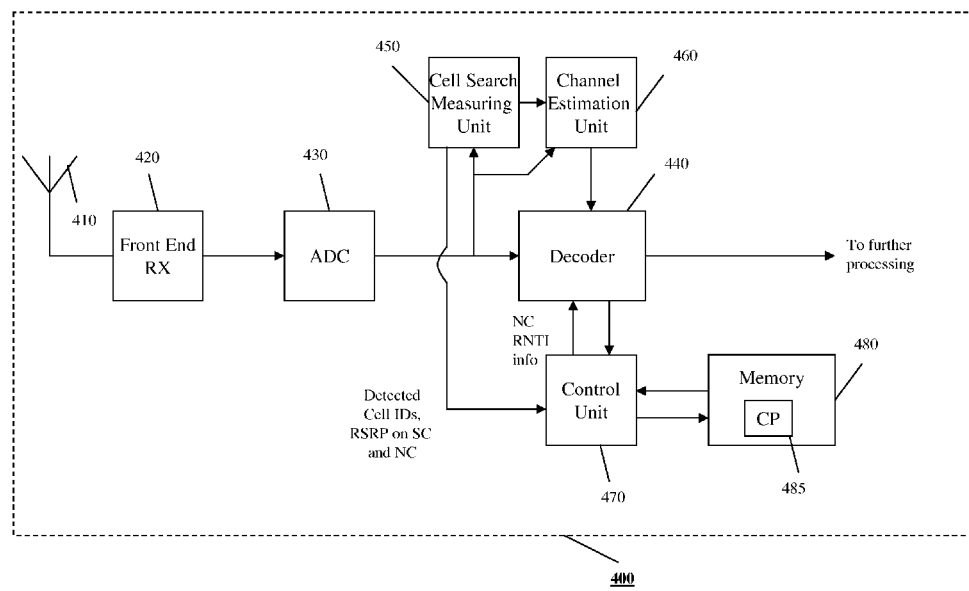
FIG. 4 illustrates a user equipment in accordance with exemplary embodiments.

A user equipment (UE) or mobile terminal in accordance with an embodiment is illustrated in FIG. 4. In user equipment 400, analog front end receiver 420 may down convert a radio signal received via antenna 410 to a baseband signal. Analog-to-digital converter 430 may transform the analog baseband signal to a digital signal. The digital signal may then be provided (or fed) to decoder 440 for decoding the signal. The digital signal may also be fed to cell search/measuring unit 450 and to channel estimation unit 460. Cell search/measuring unit 450 may perform the cell search and signal measurements on serving and detected neighboring cells. The channel estimation unit 460 may estimate the channel information needed by decoder 440 based on the digital signal and on the cell search and measurement information from cell search/measuring unit 450. Information from channel estimation unit 460 may be utilized by decoder 440 to decode the control messages.

A decoded PDCCH may be sent from decoder 440 to control unit (CU) 470 for determining the RNTI according to embodiments of the present invention. CU can also, from the history list, provide the RNTI candidates (of neighboring channels, NC) needed for the interference cancellation (IC) functionality in the decoder. This information may be utilized for further processing. The history list and RNTI information may be stored in a memory 480. The detected cell identification and RSRP on serving and neighboring cells (SC, NC) may also be provided by cell search and measuring unit 450 to control unit 470.

In some embodiments, one or more of modules 420-470 of FIG. 4 may be implemented within one or more processors. In order for these (one or more) processors to be able to perform the steps illustrated in FIG. 3, memory 480 comprises a computer program (CP) 485 with computer program modules which when run by the (one or more) processors causes user equipment 400 to perform all or some of the steps illustrated in FIG. 3. The terms user equipment and user terminal may be used interchangeably while referring to the same device.

The invention has been described with reference to particular embodiments. However, it will be readily apparent to those skilled in the art that it is possible to embody the invention in specific forms other than those of the embodiment described above. The described embodiments are merely illustrative and should not be considered restrictive in any way. The scope of the invention is given by the appended claims, rather than the preceding description, and all variations and equivalents which fall within the range of the claims are intended to be embraced therein.

What is claimed is:

1. A method in a user equipment for determining a radio network temporary identifier (RNTI), the method comprising the steps of:
   descrambling a control channel;
   decoding control messages included in the control channel wherein the decoded control messages include control bits and received cyclic redundancy check (CRC) bits;
   generating a CRC from the decoded control bits;
   determining the RNTI from the generated CRC and received CRC;
   associating a timestamp to the determined RNTI;
   storing the determined RNTI with the associated timestamp in a candidate RNTI list;
   updating a count associated with the determined RNTI;
   comparing the count of the RNTI with a pre-specified threshold value;
   storing the RNTI in a reliable candidate RNTI list if the count is equal to or greater than the threshold value; and
   utilizing the RNTI for decoding subsequent subframes.

2. The method of claim 1, further comprising:
   detecting a neighboring cell; and
   measuring signal strength on a serving cell of the user equipment and on the detected neighboring cell.

3. The method of claim 2, further comprising:
   descrambling sub frames of physical downlink control channels (PDCCHs) originating from the neighboring cell.

4. The method of claim 1, further comprising:
removing RNTIs from the candidate RNTI list if a time lapse from the timestamp of the RNTI in the candidate RNTI list exceeds a first pre-specified time period.

5. The method of claim 1, further comprising:
utilizing a RNTI from the reliable candidate RNTI list to decode subsequent subframes.

6. The method of claim 5, wherein the subsequent subframes are from a cell serving the user equipment.

7. The method of claim 5, wherein the subsequent subframes are from neighboring cells detected by the user equipment.

8. The method of claim 1, further comprising:
assigning a timestamp for the RNTI stored in the reliable candidate RNTI list.

9. The method of claim 8, further comprising:
removing a RNTI from the reliable candidate RNTI list upon a time lapse from the timestamp of the RNTI in the reliable candidate RNTI list exceeding a second pre-specified time period.

10. The method of claim 1, wherein the de-scrambling is based on at least a cell identity and a sub frame number associated with the control channel.

11. The method of claim 1, further comprising:
determining the RNTI by applying an exclusive OR (XOR) function between the generated CRC and the received CRC.

12. The method of claim 1, further comprising:
removing a RNTI from the candidate RNTI list upon placement of the RNTI in the reliable candidate RNTI list.

13. A user equipment comprising:
a receiver for down converting a received radio signal to a baseband signal;
an analog to digital converter for transforming the baseband signal to a digital signal;
a cell search and measuring unit for detecting neighboring cells and for measuring signals on a serving cell and on the detected cells;
a decoder for decoding the digital signal wherein the decoded signal includes control bits and received cyclic redundancy check (CRC) bits;
a control unit for
generating a CRC from the decoded control bits;
determining a radio network temporary identifier candidate (RNTI) from the generated CRC and received CRC; and
associating a timestamp to the determined RNTI; and
a memory for storing the determined RNTI in a candidate RNTI list with an associated timestamp and a count, wherein the control unit is further for:
updating a count associated with the determined RNTI;
comparing the count of the RNTI with a pre-specified threshold value;
storing the RNTI in a reliable candidate RNTI list if the count is equal to or greater than the threshold value; and
utilizing the RNTI for decoding subsequent subframes.

14. The user equipment of claim 13, wherein the control unit is further for:
providing RNTIs from the reliable candidate RNTI list to the decoder for decoding subsequent subframes.

15. The user equipment of claim 13, wherein the control unit is further for:
removing a RNTI from the candidate RNTI list if a time lapse from the timestamp associated with the RNTI in the candidate RNTI list exceeds a first pre-determined threshold.

16. The user equipment of claim 13, wherein the control unit is further for:
removing a RNTI from the reliable candidate RNTI list if a time lapse from the timestamp associated with the RNTI exceeds a second pre-determined threshold.

17. The user equipment of claim 13, wherein the control unit is further for:
removing a RNTI from the candidate RNTI list upon placement of the RNTI in the reliable candidate RNTI list.

18. A computer program comprising non-transitory computer readable program modules which when run on a user terminal causes the user terminal to:
descramble a control channel;
decode control messages included in the control channel wherein the decoded control messages include control bits and received cyclic redundancy check (CRC) bits;
generate a CRC from the decoded control bits;
determine the RNTI from the generated CRC and received CRC;
associate a timestamp to the determined RNTI;
store the determined RNTI with the associated timestamp in a candidate RNTI list;
update a count associated with the determined RNTI;
compare the count of the RNTI with a pre-specified threshold value;
store the RNTI in a reliable candidate RNTI list if the count is equal to or greater than the threshold value; and
utilize the RNTI for decoding subsequent subframes.

* * * * *

UNITED STATES PATENT AND TRADEMARK OFFICE
CERTIFICATE OF CORRECTION

PATENT NO. : 8,625,516 B2
APPLICATION NO. : 13/172908
DATED : January 7, 2014
INVENTOR(S) : Lindoff et al.

Page 1 of 1

It is certified that error appears in the above-identified patent and that said Letters Patent is hereby corrected as shown below:

In the Specification

In Column 3, Line 6, delete "embodiments;" and insert -- embodiments. --, therefor.

In Column 4, Line 2, delete "$x_{mti}$" and insert -- $x_{rnti}$ --, therefor.

Signed and Sealed this
Third Day of March, 2015

Michelle K. Lee
*Deputy Director of the United States Patent and Trademark Office*